(12) United States Patent
Bickerstaff et al.

(10) Patent No.: US 11,276,196 B2
(45) Date of Patent: Mar. 15, 2022

(54) VIDEO PROCESSING

(71) Applicant: Sony Interactive Entertainment Inc., Tokyo (JP)

(72) Inventors: Ian Henry Bickerstaff, London (GB); Andrew Damian Hosfield, London (GB); William John Dudley, London (GB); Nicola Orrù, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 65 days.

(21) Appl. No.: 16/849,118

(22) Filed: Apr. 15, 2020

(65) Prior Publication Data

US 2020/0334852 A1 Oct. 22, 2020

(30) Foreign Application Priority Data

Apr. 16, 2019 (GB) ...................................... 1905351
Nov. 1, 2019 (GB) ...................................... 1915894

(51) Int. Cl.
*G06T 7/73* (2017.01)
*G06K 9/00* (2006.01)

(52) U.S. Cl.
CPC ............ *G06T 7/73* (2017.01); *G06K 9/00342* (2013.01); *G06K 9/00369* (2013.01); *G06T 2207/30204* (2013.01)

(58) Field of Classification Search
CPC ........ H04N 5/235; H04N 5/445; H04N 5/262; G06K 9/00765; G06K 9/621; G06K 9/6269; G06K 9/00335; G06K 9/00711; G06K 9/00342; G06K 9/00369; G06T 2207/10016; G06T 15/04; G06T 3/40; G06T 2207/30204; G06T 7/0002;
(Continued)

(56) References Cited

U.S. PATENT DOCUMENTS 6,600,491 B1 * 7/2003 Szeliski .................. G06T 13/80
345/421
2009/0041310 A1 * 2/2009 Yang .................. G06K 9/00275
382/118
(Continued)

FOREIGN PATENT DOCUMENTS

WO WO-2020068739 A1 * 4/2020 ............. G06F 3/017

OTHER PUBLICATIONS

Pavan Taruga—Machine Recognition of Human Activities: A survey (Year: 2008).*
(Continued)

*Primary Examiner* — Nizar N Sivji
(74) *Attorney, Agent, or Firm* — Matthew B. Dernier, Esq.

(57) ABSTRACT

A video processing method includes detecting, as a reference pose, a pose of an individual at a reference time point in an input video sequence; at a second, different, time point in the input video sequence, detecting a second pose of the individual; generating from one or more source images of the individual, a transitional video sequence representing a transition of the individual from the second pose to the reference pose; and associating the transitional video sequence with the input video sequence to generate an output video sequence including at least the transitional video sequence to implement a non-linear replay branch from the second time point to the reference time point.

11 Claims, 5 Drawing Sheets

(58) Field of Classification Search
CPC ..... G06T 7/11; G06T 7/20; G06T 7/75; G06T 7/73; G06T 2207/10021; G06T 2207/10024; G06T 7/194; G06T 13/40; G06T 2207/20081; G06T 2207/20084; G06T 2207/30196; G06T 2210/44; G06T 13/80; G06T 7/70

See application file for complete search history.

(56) References Cited

U.S. PATENT DOCUMENTS

| | | | | |
|---|---|---|---|---|
| 2010/0183071 | A1* | 7/2010 | Segall | H04N 5/2355 375/240.16 |
| 2013/0163815 | A1* | 6/2013 | Mai | G06T 7/20 382/103 |
| 2013/0271458 | A1* | 10/2013 | Andriluka | G06T 7/55 345/420 |
| 2014/0071287 | A1 | 3/2014 | Tu | |
| 2014/0198948 | A1* | 7/2014 | Sigal | G01C 11/04 382/103 |
| 2016/0019709 | A1* | 1/2016 | Moll | G06T 13/40 345/589 |
| 2016/0073179 | A1* | 3/2016 | Havekes | G06T 7/20 725/32 |
| 2018/0137367 | A1* | 5/2018 | Pavetic | G06K 9/00758 |
| 2018/0218243 | A1 | 8/2018 | Felsen | |
| 2019/0228215 | A1* | 7/2019 | Najafirad | G06N 20/00 |

OTHER PUBLICATIONS

Peng Huang—Shape Similarity for 3D Video Sequences of People (Year: 2010).*
Jie Liu—A spatial and temporal features mixture model with body parts for video-based person re-identification (Year: 2019).*
Extended European Search Report for corresponding EP Application No. 20168385.1, 11 pages, dated Sep. 18, 2020.
Amo Schodl et al., "Controlled Animation of Video Sprites" The Association of Computer Machinery Inc., ACM Siggraph Symposium on Computer Animation, pp. 121-127, Jul. 21, 2002.
Juan Du et al., "3D Human Skeleton Synergy Kinematics Based on the Video" 2012 Symposium On Photonics and Optoelectronics, pp. 1-4, May 1, 2012.
Combined Search and Examination Report for corresponding GB Application No. 1905351.1, dated Oct. 15, 2019.

* cited by examiner

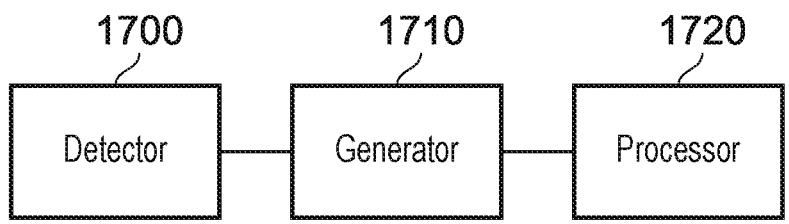
FIG. 17
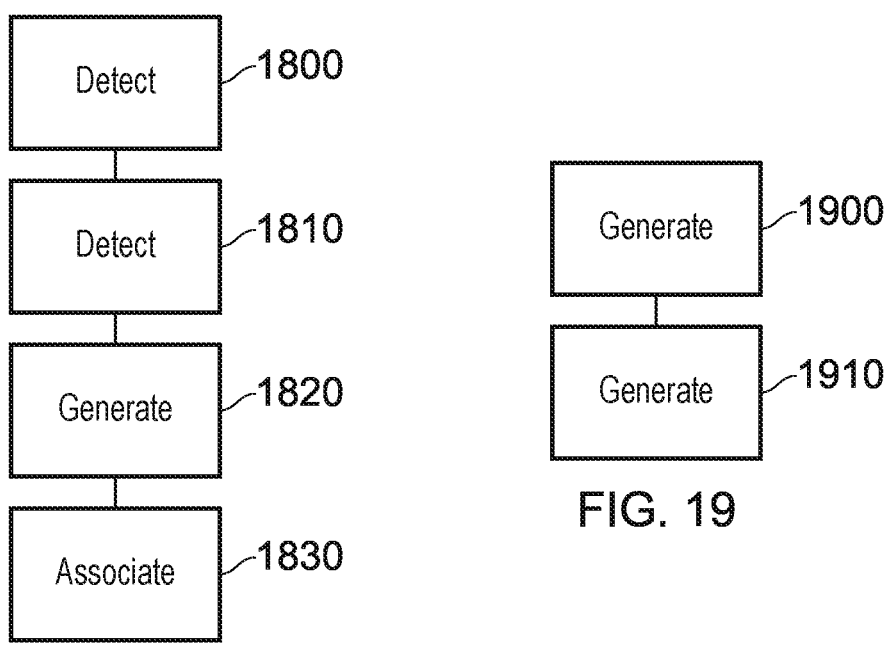
FIG. 18
FIG. 19
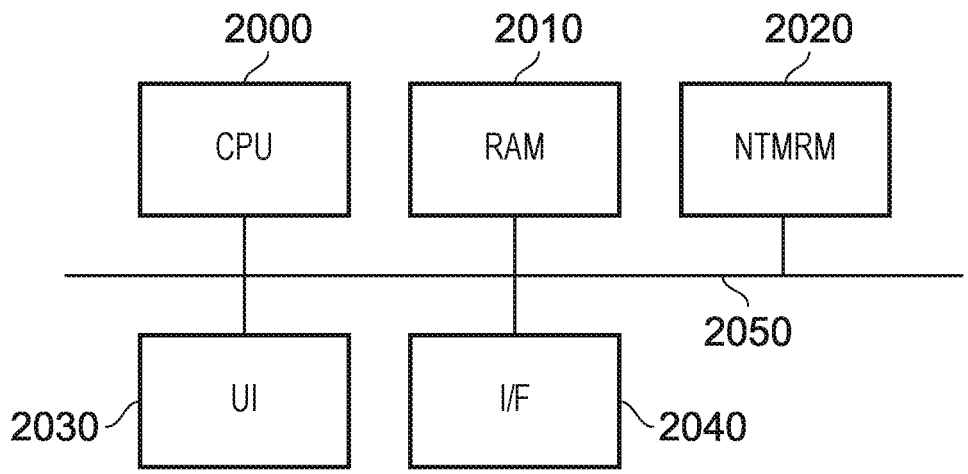
FIG. 20

VIDEO PROCESSING

BACKGROUND

Field

This disclosure relates to video processing methods and apparatus.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, is neither expressly or impliedly admitted as prior art against the present disclosure.

Some video programme products, such as video game products or non-linear movie products, allow for non-linear video replay branches in dependence upon user interactions or other inputs.

SUMMARY

The present disclosure provides a video processing method comprising:

detecting, as a reference pose, a pose of an individual at a reference time point in an input video sequence;

at a second, different, time point in the input video sequence, detecting a second pose of the individual;

generating from one or more source images of the individual, a transitional video sequence representing a transition of the individual from the second pose to the reference pose; and associating the transitional video sequence with the input video sequence to generate an output video sequence including at least the transitional video sequence to implement a non-linear replay branch from the second time point to the reference time point.

The present disclosure also provides a method of generating a video programme product, the method comprising:

generating one or more output video sequences as defined above;

generating control signals defining transitions between the output video sequences in dependence upon user interactions during reproduction of the video programme product.

The present disclosure also provides video processing apparatus comprising:

a detector configured to detect, as a reference pose, a pose of an individual at a reference time point in an input video sequence and to detect, at a second, different, time point in the input video sequence, a second pose of the individual;

a generator configured to generate from one or more source images of the individual, a transitional video sequence representing a transition of the individual from the second pose to the reference pose; and a processor to associate the transitional video sequence with the input video sequence to generate an output video sequence including at least the transitional video sequence to implement a non-linear replay branch from the second time point to the reference time point.

Further respective aspects and features of the present disclosure are defined in the associated claims.

It is to be understood that both the foregoing general description and the following detailed description are exemplary, but are not restrictive, of the present technology.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, in which:

FIG. 17 schematically illustrates an apparatus;

FIGS. 18 and 19 are schematic flowcharts illustrating respective methods; and FIG. 20 schematically illustrates a data processing apparatus.

DESCRIPTION OF THE PREFERRED EMBODIMENTS

Figure 1:
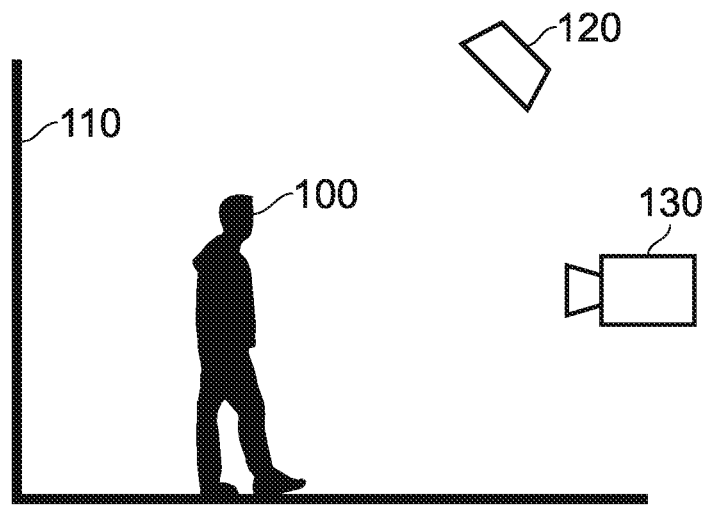
FIGS. 1 and 2 schematically illustrate a chroma key compositing image capture operation.
Figure 2:
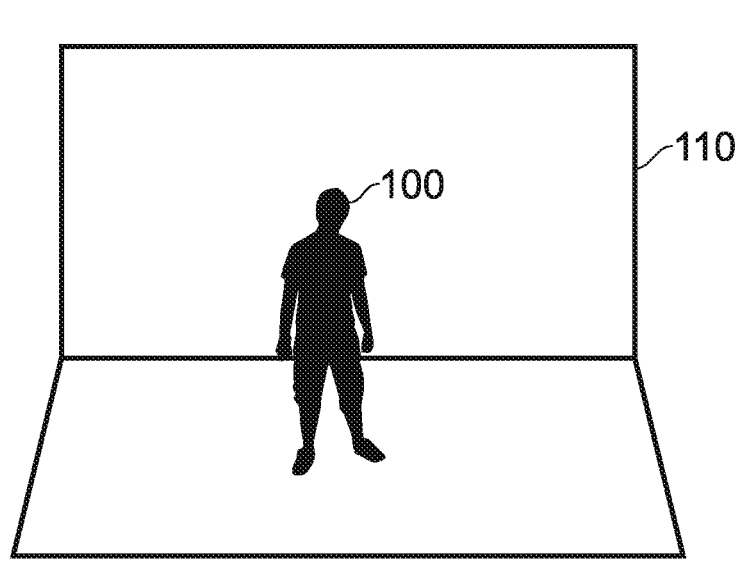

Referring now to the drawings, FIGS. 1 and 2 schematically illustrate a so-called chroma key compositing (or colour shift overlay) image capture operation, as one example of a technique suitable for detecting an individual in a video scene or image.

Here, a subject 100 such as an individual actor is positioned in front of a coloured background 110 often referred to as a "green screen" (though it is noted that key colours other than green may be used; colours which tends not to occur in skin tones, such as green or blue, are considered useful for this purpose). The subject 100 is illuminated by one or more light sources shown schematically as light sources 120 (though the light source could be provided as, for example, a window to allow ambient light in) and images are captured by one or more cameras 130.

The captured images will show the subject 100 against a green (or other predetermined key colour) background. In subsequent image processing, regions or pixels formed of the key colour are identified and may be substituted by other image material, so that the subject 100 appears to be in front of or surrounded by the other image material.

FIG. 2 provides a front view of the same scene as FIG. 1, for example from the point of view of the camera 130.

Therefore FIGS. 1 and 2 provide an example of the use of a background screen 110 of the predetermined key colour disposed so that an image subject is captured in front of the background screen; and a lighting arrangement 120 to illuminate the image subject.

Figure 3:
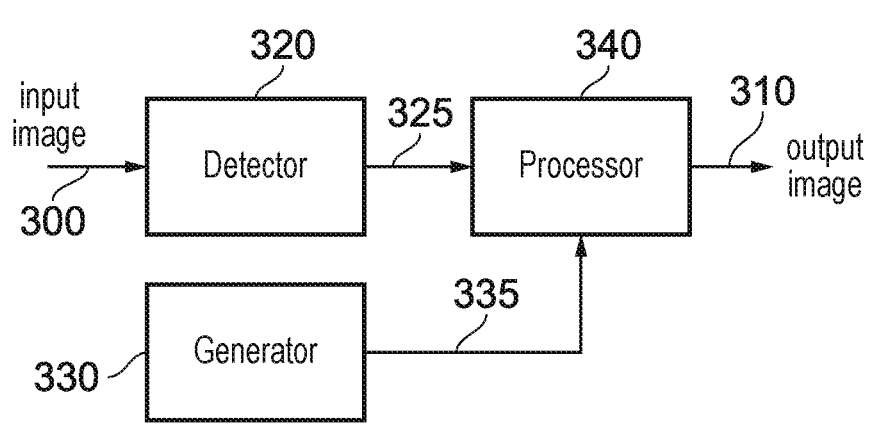
FIG. 3 schematically illustrates an image processing apparatus.

FIG. 3 schematically illustrates an image processing apparatus configured to receive an input image 300, for example an image captured of the scene shown in FIGS. 1 and 2, to apply chroma key compositing, and thus to generate an output image 310 representing the subject 100 in front of a substitute applied background.

Returning to FIG. 3, a detector 320 detects image positions at which the key colour is present in the captured input image 300 and generates an output 325 representing those portions of the input image 300 other than portions at which the key colour is present. A background generator 330 generates a background 335 which is provided, along with the output 325 of the detector 320, to a processor 340 which combines the signal 325 with the background 335 to generate the output image 310 representing the subject 100 in front of the substitute applied background 335.

In other arrangements the signal 325 can be a so-called mask indicating portions of the input image 300 at which the key colour is detected to be present or not present, and the processor (which would also receive the input image in this arrangement) uses the mask to select between the input image 300 and the replacement background 335 on a pixel by pixel basis.

Embodiments of the present disclosure relate to arrangements in which captured video sequences may need to be presented to a viewer in a potentially non-linear fashion. For example, such arrangements can relate to non-linear movies or to video games in which the storyline reflected by the video sequence may branch depending upon various interactions provided by the viewer. For example, the video sequence may be embodied in a video programme product such as a computer game product, and the user interactions may be for example video game interactions.

In at least some examples, the video sequence may be a stereoscopic video sequence reproducible by, for example, a head mountable display (HMD). In such examples the video programme product may be a stereoscopic video programme product.

Figure 4:
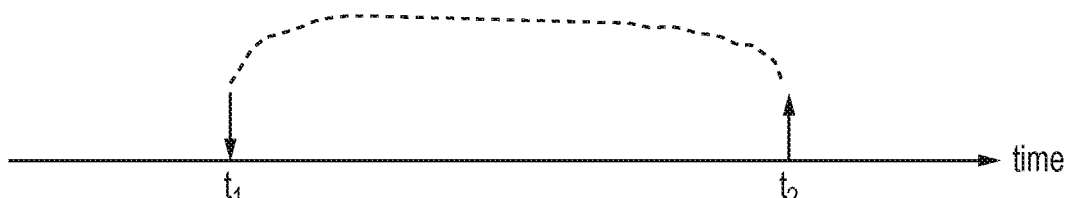
FIGS. 4 to 9 schematically illustrate the use of transitional sequences in non-linear video transitions.

Referring to FIG. 4, a video sequence is captured according to the passage of time as represented by a horizontal axis. Because of the potential non-linear branching of the video storyline, it may be that at a point $t_2$ the display of the video sequence branches back to a time point $t_1$. Note that the branching is dependent upon viewer interaction so it may happen or it may not happen.

In order to avoid subjectively disturbing discontinuities in the appearance of the actor or actors involved, it is desirable that at least the actor's pose is the same at the time points $t_1$ and $t_2$. In previously proposed arrangements, this would require the actor to physically return to the pose that they previously occupied at $t_1$ so as to resume the same pose at $t_2$. This is actually quite a difficult and potentially uncomfortable thing for an actor to have to do, and may be only partially successful even if the actor attempts it.

In FIG. 4, the second (potentially branching) time point $t_2$ is later in time, with respect to the input video signal, than the reference (branch target) time point $t_1$.

Figure 5:
Figure 6:
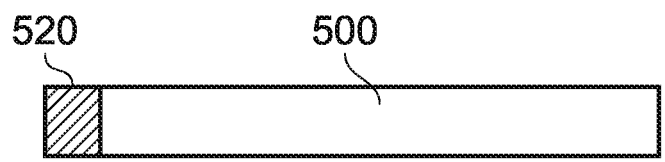

Referring to FIGS. 5 and 6, assuming that an unshaded block 500 represents a video sequence captured between the times $t_1$ and $t_2$, in some example embodiments a transitional sequence 510 is appended to the video sequence 500. In the transitional sequence the actor's pose is transitioned from the actor's pose at the time $t_2$ into the actor's pose at the time $t_1$. So, in order to execute the non-linear flow from the time $t_2$ to the time $t_1$ as captured, first the transitional sequence 510 is displayed or presented to the viewer and then display resumes from the video sequence at the time $t_1$.

In another arrangement shown in FIG. 6, a transitional sequence 520 precedes the video sequence 500 so that on transitioning from the time $t_2$ in the captured video to the time $t_1$ in the captured video, first the transitional sequence 520 is displayed to return the actor's pose to the pose at the captured time $t_1$, and then the video sequence 500 is played.

Figure 7:
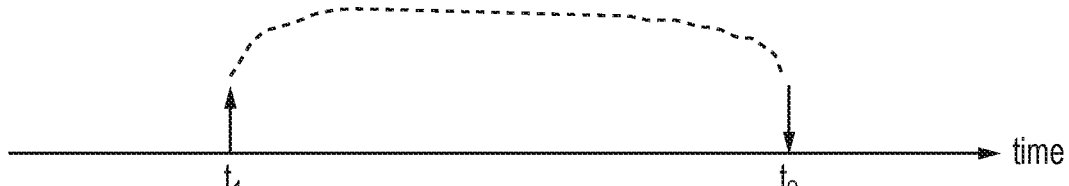
Figure 8:
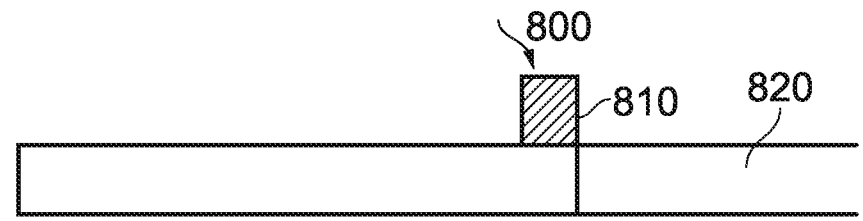
Figure 9:
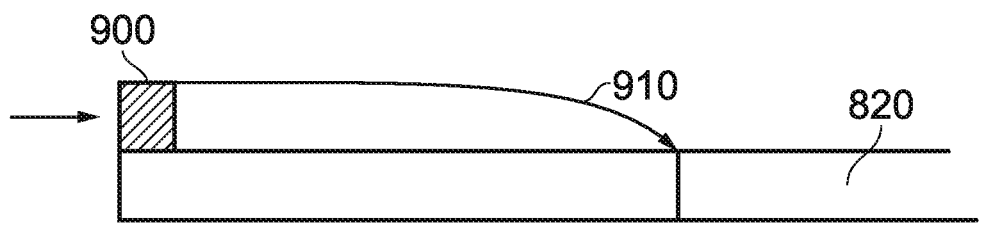

FIGS. 7 to 9 show a similar arrangement but one in which the non-linear flow is such that potentially the display of the video sequence can selectively (under control of a user interaction for example) jump forward from the time $t_1$ from the time $t_2$. Referring to FIG. 8, if such a jump takes place, the re-entry point or branch target can be the start 800 of a transitional sequence 810 which transitions the actor's pose from the pose held at $t_1$ to the pose held at $t_2$ with replay then continuing 820 from $t_2$ onwards. Alternatively, as shown in FIG. 9, if such a branch is triggered, a transitional sequence 900 can be replayed before the transition 910 to the time $t_2$ is effected.

In each of these cases, a reference pose is detected at the non-linear jump target ($t_1$ in FIG. 4, $t_2$ in FIG. 7) and differences between a second pose (at $t_2$ in FIG. 4 or $t_1$ in FIG. 7) and the respective reference pose are used to generate the respective transitional sequence which is then combined with the captured video to allow for such non-linear transitions. It can be seen that in FIGS. 5, 6, 8 and 9, the transitional video sequence can be associated with the second time point or with the reference time point.

Therefore, in summary of these arrangements reference is made to the following table:

|  | reference time point | second time point | non-linear branch | Output video sequence |
| --- | --- | --- | --- | --- |
| FIGS. 4 and 5 | t1 | t2 | from t2 to t1 | 500 then 510 |
| FIGS. 4 and 6 | t1 | t2 | from t2 to t1 | 520 then 500 |
| FIGS. 7 and 8 | t2 | t1 | from t1 to t2 | 800 |
| FIGS. 7 and 9 | t2 | t1 | from t1 to t2 | 900 |

Each of these involves a non-liner replay branch (either backwards or forwards) from the second time point to the reference time point, and the use of the transitional video sequence allows for a transition in pose without including subjectively disturbing pose discontinuities. The output video sequence includes at least the transitional video sequence (500, 510, 800, 900) in each case. In some examples (such as those relating to backward branches) it also includes a portion of the input video sequence.

The arrangement allows for the implementation of replay including the non-linear replay branch with a continuous or substantially continuous pose of the individual. In this context, "continuous" may be taken to mean that pose discontinuities (variations in position of any limb or segment) at or caused by the transition are less than a threshold amount. The same threshold will be discussed below in connection with the selection of a number of intermediate images or frames for the transitional video sequence.

Note that the same arrangement can be used to provide a branch reply from one video sequence to another, particularly where the same individual appears in the original and target sequences.

Figure 10A:
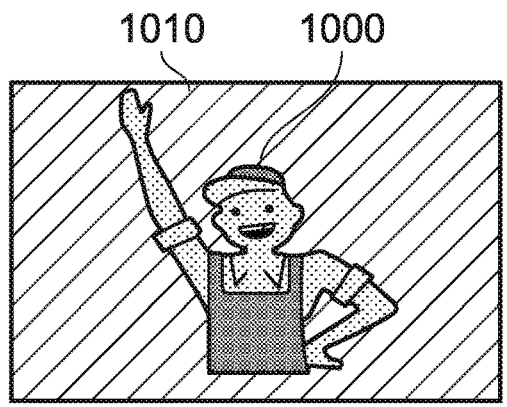
FIGS. 10a to 10c schematically illustrate a pose detection process.
Figure 10B:
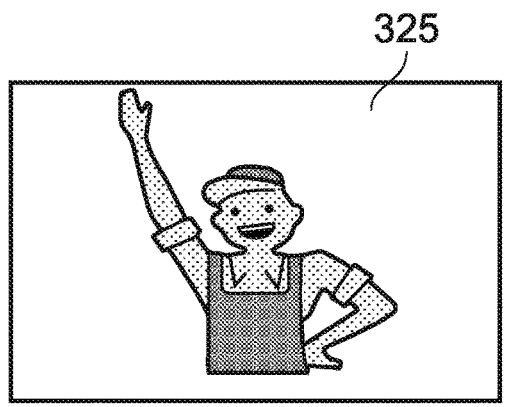
Figure 10C:
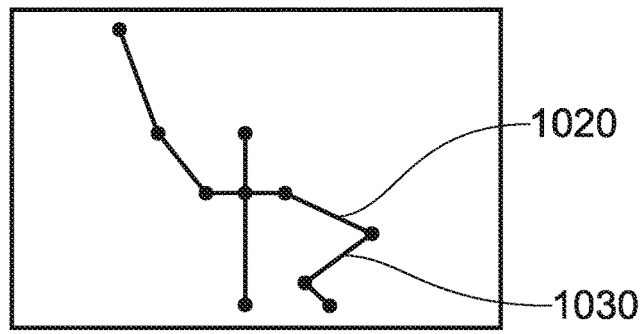

FIGS. 10a-10c schematically represent a version of the arrangement of FIGS. 1 and 2 in which a subject 1000 is captured in a video image in front of a chroma key screen 1010. FIG. 10b is a representation of the signal 325 generated by the detector 320 in which portions of the captured image formed of the key colour are removed. The chroma key masking is used to remove non-subject background and so to facilitate the generation of pose information. In FIG. 10c the remaining image portion relating only to the subject 1000, is processed to generate a skeletal (otherwise colloquially referred to as a stick-man) pose representation 1020. Segments 1030 represent respective limbs or limb portions.

Note that the chroma key technique discussed above is just one way of detecting the presence of the individual in the video images and its use is not essential. Other possible techniques to implement a step of detecting an individual as part of detecting a reference or other pose may include using stereoscopic image capture or other image capture providing a depth indication (such as image capture using so-called "structured light" in which a grid or other pattern of light, for example infra-red light, is projected onto the scene to be captured so that images which detect the structured light, such as infra-red images, can detect depth from distortions of the structured light pattern) and detecting the presence of the individual in response to the depth detections so as to distinguish background (greater depth) from individual (lesser depth). Another possible technique involves using artificial intelligence, for example so-called deep learning techniques. Another possible technique involves manual subject extraction using so-called rotoscoping.

The generation of such skeletal poses can (as an example) use techniques disclosed in the paper "Everybody Dance Now" (Chan et al) incorporated herein by reference and published in August 2018 at the location: https://arxiv.org/pdf/1808.07371.pdf In the Chan paper, a pose detector P, provided as a trained artificial neural network (ANN) generates the skeletal representation from video frames of a subject. Technical details of how this is achieved are disclosed by the Chan paper.

Figure 11:
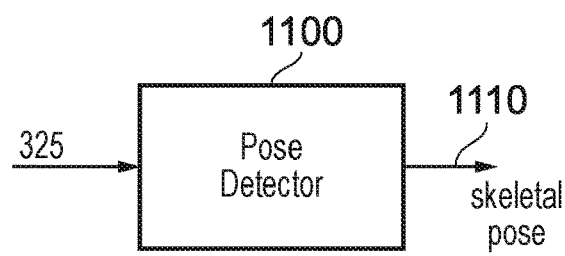
FIG. 11 schematically illustrates a pose detector.

Such an arrangement is shown schematically in FIG. 11, in which a pose detector 1100 is responsive to the signal 325 and/or the input image 300 to generate the skeletal pose representation 1110 for a particular image. In the present examples, the particular images for which such a pose is generated are the images at the times $t_1$ and $t_2$ discussed above, one of these being a reference image position (at the branch target of the potential non-linear video programme flow branch) and the other being a second image at the branching point in the non-linear video programme flow.

Figure 12:
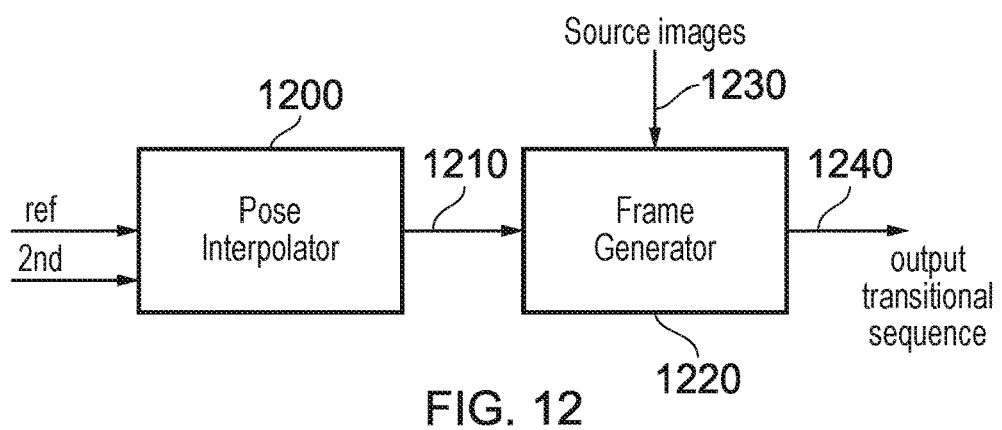
FIG. 12 schematically illustrates a transitional sequence generator.

The skeletal pose for each of the reference and second images are provided (FIG. 12) to a pose interpolator 1200. This detects limb-by-limb (or limb portion by limb portion, in other word segment by segment) differences in the respective poses and generates a series 1210 of intermediate poses so as to provide a smooth transition from one to the other of the second poses. In particular, given that the reference pose relates to the branch target in the program flow, the transition is from the second pose to the reference pose. The number of intermediate poses can depend upon the magnitude of difference between the two input poses. If each limb or segment needs to move only a small amount between the two poses, a smaller number of intermediate skeletal poses can be generated. If there is a more significant movement between the two poses, more intermediate poses may be required. The aim of the pose interpolator is that, from one pose to the next, a sufficiently small movement of any individual limb or segment takes place that the movement does not look jerky or unnatural when later transformed back to successive image videos. In at least some example, generating the transitional video sequence comprises selecting a number of frames for the transitional video sequence so as not to exceed a threshold maximum pose change of any portion of the individual (for example, one or both of an angular or lateral threshold of inter-frame motion of a limb, limb portion or segment) between successive frames.

Therefore, the selection of a number of intermediate frames or images can be dealt with as follows: the step of generating the transitional video sequence can comprise selecting a number of frames for the transitional video sequence in response the magnitude of difference between the second pose and the reference pose so as to provide sufficient intermediate poses that each limb or segment of the individual does not exceed a threshold maximum pose change between successive frames.

The intermediate poses are provided to a frame generator 1220 which is responsive to source images 1230 captured of the subject and uses techniques described under the heading of "transfer" in the Chan paper to generate animated frames or images of the subject based on the captured source images 1230, each frame representing a respective intermediate pose. So, the combination of the successive frames representing the intermediate poses provides a transition or linkage between the second pose and the reference pose as a video output transitional sequence 1240 for use as any of the transitional sequences 510, 520 810, 900 discussed above.

Figure 13:
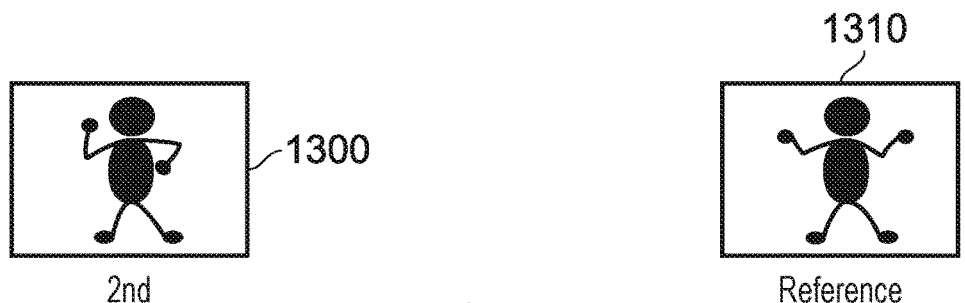
FIGS. 13 to 16 provide schematic diagrams illustrating stages in the generation of a transitional sequence.

FIG. 13-16 provide a worked example of this process. In particular, FIG. 13 represents captured images relating to the second (branch point) 1300 and reference (branch target) 1310 positions in the captured video sequence.

Figure 14:
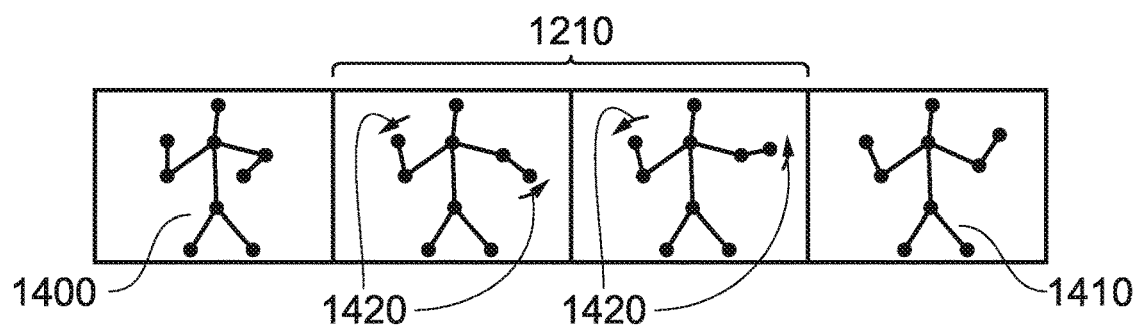

In FIG. 14, a skeletal pose 1400 is generated by the pose detector 1100 for the second pose and a skeletal pose 1410 is generated by the pose detector 1100 for the reference pose. This provides an example of detecting a reference skeletal pose 1410 of the individual at the reference time point; and detecting a second skeletal pose 1400 of the individual at the second time point.

The pose interpolator 1200 detects differences between these two skeletal poses and interpolates a set of intermediate poses 1210 between the two. In the example of FIG. 14, there are two intermediate poses which provide sufficient variation, pose-to-pose to allow a smooth transition between the skeletal pose 1400 and the skeletal pose 1410. From pose to pose, there are incremental movements 1420 in the two upper limbs, being the limbs for which differences are detected between the pose 1400 and the pose 1410.

Figure 15:
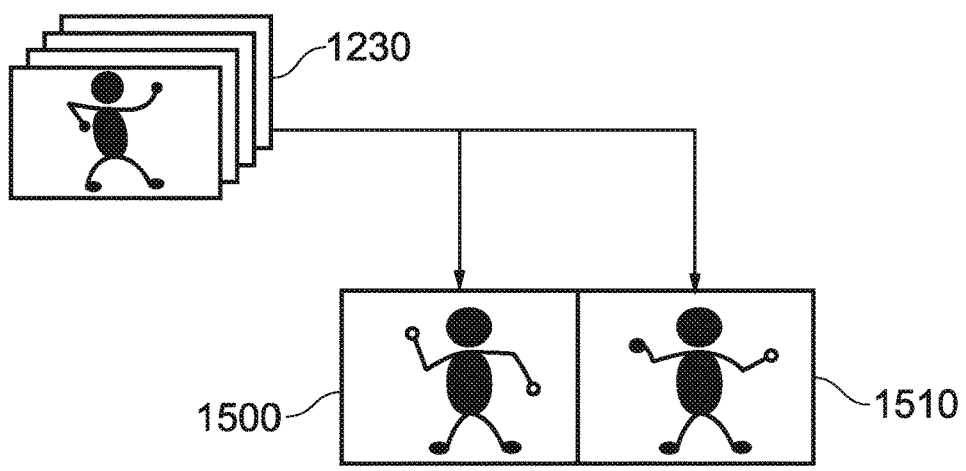

In FIG. 15, the frame generator 1220 generates respective intermediate frames or images 1500, 1510 from the source images 1230 (a library of example images of the individual or actor as discussed in the Chan paper) corresponding to each of the intermediate skeletal poses 1210.

The result is the intermediate video sequence 1240 providing a transition between the second image 1300 and the reference image 1310 so that in the case of a selectable non-linear branch or transition in the replayed video from the second frame to the reference frame, the transitional sequence 1240 can be replayed so as to provide a smooth transition to the reference pose.

Figure 16:
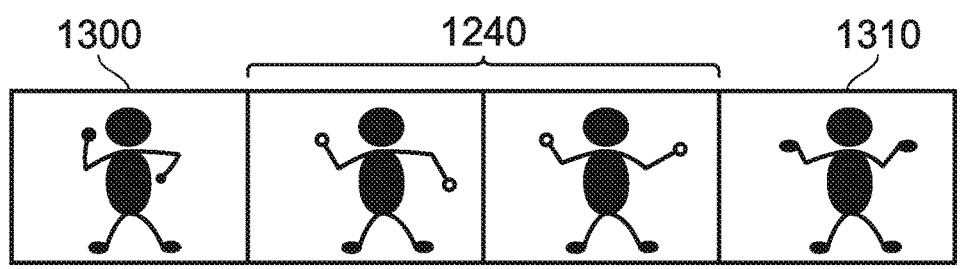

Therefore, the process illustrated in FIGS. 14 to 16 provides an example of generating a sequence 1210 of skeletal representations which transition from the reference skeletal pose to the second skeletal pose; and generating respective video images 1240 of the individual for each of the sequence of skeletal representations in dependence upon the one or more source images.

By way of summary and making use of the techniques described here, FIG. 17 schematically illustrates a video processing apparatus comprising:

a detector 1700 configured to detect, as a reference pose, a pose of an individual at a reference time point in an input video sequence and to detect, at a second, different, time point in the input video sequence, a second pose of the individual;

a generator 1710 configured to generate from one or more source images of the individual, a transitional video sequence representing a transition of the individual from the second pose to the reference pose; and a processor 1720 configured to associate the transitional video sequence with the input video sequence to generate an output video sequence including at least the transitional video sequence to implement a non-linear replay branch from the second time point to the reference time point.

FIG. 18 is a schematic flowchart illustrating a video processing method comprising:

detecting (at a step 1800), as a reference pose, a pose of an individual at a reference time point in an input video sequence;

at a second, different, time point in the input video sequence, detecting (at a step 1810) a second pose of the individual;

generating (at a step 1820) from one or more source images of the individual, a transitional video sequence representing a transition of the individual from the second pose to the reference pose; and associating (at a step 1830) the transitional video sequence with the input video sequence to generate an output video sequence including at least the transitional video sequence to implement a non-linear replay branch from the second time point to the reference time point.

FIG. 19 is a further schematic flowchart illustrating a method of generating a video programme product, the method comprising:

generating (at a step 1900) one or more output video sequences according to FIG. 18 or variants of that method as discussed here; and generating (at a step 1910) control signals defining transitions between the output video sequences in dependence upon user interactions during reproduction of the video programme product.

FIG. 20 schematically illustrates a data processing apparatus suitable to carry out the methods discussed above and in particular to implement one or both of the auto-encoder and the classification system, comprising a central processing unit or CPU 2000, a random access memory (RAM) 2010, a non-transitory machine-readable memory or medium (NTMRM) 2020 such as a flash memory, a hard disc drive or the like, a user interface such as a display, keyboard, mouse, or the like 2030, and an input/output interface 2040. These components are linked together by a bus structure 2050. The CPU 2000 can perform any of the above methods under the control of program instructions stored in the RAM 2010 and/or the NTMRM 2020. The NTMRM 2020 therefore provides an example of a non-transitory machine-readable medium which stores computer software by which the CPU 2000 perform the method or methods discussed above.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Similarly, a data signal comprising coded data generated according to the methods discussed above (whether or not embodied on a non-transitory machine-readable medium) is also considered to represent an embodiment of the present disclosure.

It will be apparent that numerous modifications and variations of the present disclosure are possible in light of the above teachings. It is to be understood that the disclosure is defined by the appended claims.

The invention claimed is:

1. A video processing method comprising:
    detecting, as a reference pose, a pose of an individual at a reference time point in an input video sequence;
    at a second, different, time point in the input video sequence, detecting a second pose of the individual;
    generating from one or more source images from a library of example images of the individual, a transitional video sequence representing a transition of the individual from the second pose to the reference pose; and
    associating the transitional video sequence with the input video sequence to generate an output video sequence including at least the transitional video sequence to implement a non-linear replay branch from the second time point to the reference time point,
    wherein the generating the transitional video sequence comprises selecting a number of frames for the transitional video sequence in response the magnitude of difference between the second pose and the reference pose so as to provide sufficient intermediate poses that each limb or segment of the individual does not exceed a threshold maximum pose change between successive frames.

2. The method of claim 1, in which:
    the step of detecting the reference pose comprises detecting a reference skeletal pose of the individual at the reference time point; and
    the step of detecting the second pose comprises detecting a second skeletal pose of the individual at the second time point.

3. The method of claim 2, in which the generating step comprises:
    generating a sequence of skeletal representations which transition from the reference skeletal pose to the second skeletal pose; and
    generating respective video images of the individual for each of the sequence of skeletal representations in dependence upon the one or more source images.

4. The method of claim 1, in which the second time point is later in time, with respect to the input video signal, than the reference time point.

5. The method of claim 1, in which the associating step comprises associating the transitional video sequence with the second time point.

6. The method of claim 1, in which the associating step comprises associating the transitional video sequence with the reference time point.

7. A method of generating a video program product, the method comprising:
    generating one or more output video sequences according to claim 1;
    generating control signals defining transitions between the output video sequences in dependence upon user interactions during reproduction of the video program product.

8. The method of claim 7, in which the video program product is a computer game product, and the user interactions are video game interactions.

9. The method of claim 7, in which the video program product is a stereoscopic video program product.

10. A non-transitory machine-readable storage medium which stores computer software, which when executed by a computer, causes the computer to conduct a video processing method by carrying out actions, comprising:
    detecting, as a reference pose, a pose of an individual at a reference time point in an input video sequence;

at a second, different, time point in the input video sequence, detecting a second pose of the individual;

generating from one or more source images from a library of example images of the individual, a transitional video sequence representing a transition of the individual from the second pose to the reference pose; and associating the transitional video sequence with the input video sequence to generate an output video sequence including at least the transitional video sequence to implement a non-linear replay branch from the second time point to the reference time point, wherein the generating the transitional video sequence comprises selecting a number of frames for the transitional video sequence in response the magnitude of difference between the second pose and the reference pose so as to provide sufficient intermediate poses that each limb or segment of the individual does not exceed a threshold maximum pose change between successive frames.

11. Video processing apparatus comprising:

a detector configured to detect, as a reference pose, a pose of an individual at a reference time point in an input video sequence and to detect, at a second, different, time point in the input video sequence, a second pose of the individual;

a generator configured to generate from one or more source images from a library of example images of the individual, a transitional video sequence representing a transition of the individual from the second pose to the reference pose; and a processor to associate the transitional video sequence with the input video sequence to generate an output video sequence including at least the transitional video sequence to implement a non-linear replay branch from the second time point to the reference time point, wherein the generator is further configured to select a number of frames for the transitional video sequence in response the magnitude of difference between the second pose and the reference pose so as to provide sufficient intermediate poses that each limb or segment of the individual does not exceed a threshold maximum pose change between successive frames.

* * * * *